(12) United States Patent
Yoo et al.

(10) Patent No.: US 10,234,847 B2
(45) Date of Patent: Mar. 19, 2019

(54) TERMINAL AND METHOD FOR SUPPORTING 3D PRINTING, AND COMPUTER PROGRAM FOR PERFORMING THE METHOD

(71) Applicant: Korea Institute of Science and Technology, Seoul (KR)

(72) Inventors: Byounghyun Yoo, Seoul (KR); Sangchul Ahn, Seoul (KR); Heedong Ko, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 340 days.

(21) Appl. No.: 14/697,977

(22) Filed: Apr. 28, 2015

(65) Prior Publication Data

US 2016/0054726 A1 Feb. 25, 2016

(30) Foreign Application Priority Data

Aug. 19, 2014 (KR) .......................... 10-2014-0107733

(51) Int. Cl.
*G06F 19/00* (2018.01)
*G05B 19/4099* (2006.01)

(52) U.S. Cl.
CPC .................... *G05B 19/4099* (2013.01); *G05B 2219/49008* (2013.01); *G05B 2219/49023* (2013.01)

(58) Field of Classification Search
CPC ... G06T 17/00; G06T 119/00; G05B 19/4099; G05B 2219/49008; G05B 2219/49023
See application file for complete search history.

(56) References Cited

U.S. PATENT DOCUMENTS

| 9,094,670 | B1* | 7/2015 | Furio | H04N 13/0221 |
| 2004/0103093 | A1* | 5/2004 | Furuhashi | G06F 17/30247 |
| 2012/0113140 | A1* | 5/2012 | Hilliges | G06F 3/011 345/633 |
| 2012/0221433 | A1* | 8/2012 | Plattsmier | G06Q 30/0633 705/26.8 |
| 2014/0100997 | A1* | 4/2014 | Mayerle | G06Q 30/0643 705/27.2 |
| 2014/0139639 | A1* | 5/2014 | Wagner | G06T 17/00 348/46 |
| 2014/0282220 | A1* | 9/2014 | Wantland | G06F 3/04845 715/782 |
| 2014/0379468 | A1* | 12/2014 | Ganesh | G06O 30/0623 705/14.53 |

(Continued)

FOREIGN PATENT DOCUMENTS

| JP | 2002-358334 A | 12/2002 |
| KR | 10-2011-0062870 A | 6/2011 |
| KR | 10-2012-0017320 A | 2/2012 |

*Primary Examiner* — Thomas C Lee
*Assistant Examiner* — Zhipeng Wang
(74) *Attorney, Agent, or Firm* — NSIP Law

(57) ABSTRACT

A method for supporting 3D printing includes identifying a product, searching and providing a 3D model present on a web in relation to the identified product, calculating and simulating suitability between the identified product and the searched 3D model based on information of the identified product and the searched 3D model, and transmitting the 3D model information to a 3D printer to produce the 3D model. Accordingly, the 3D printing technique may be actively utilized for DIY in various fields, business models or the like.

19 Claims, 11 Drawing Sheets

(56) References Cited

U.S. PATENT DOCUMENTS

| | | | | |
|---|---|---|---|---|
| 2015/0070347 A1* | 3/2015 | Hofmann | ............ | G06K 9/00208 |
| | | | | 345/419 |
| 2015/0112835 A1* | 4/2015 | Stewart | ............ | H04N 21/23614 |
| | | | | 705/26.8 |
| 2015/0178321 A1* | 6/2015 | Rivlin | ............... | G06F 17/30277 |
| | | | | 707/728 |
| 2015/0186418 A1* | 7/2015 | Harp | ................. | G06F 17/30259 |
| | | | | 707/723 |
| 2015/0186457 A1* | 7/2015 | Enomoto | ................ | G06F 17/50 |
| | | | | 707/769 |

* cited by examiner

TERMINAL AND METHOD FOR SUPPORTING 3D PRINTING, AND COMPUTER PROGRAM FOR PERFORMING THE METHOD

CROSS-REFERENCE TO RELATED APPLICATION

This application claims priority to Korean Patent Application No. 2014-0107733, filed on Aug. 19, 2014, and all the benefits accruing therefrom under 35 U.S.C. § 119, the contents of which in its entirety are herein incorporated by reference.

BACKGROUND

1. Field

The present disclosure relates to a terminal and method for supporting 3D printing, and a computer program for performing the method, and more particularly, to a terminal and method for supporting 3D printing using augmented reality of a mobile environment, and a computer program for performing the method.

2. Description of the Related Art

Recently, the 3D printing technology gives monumental changes in product development. The open-source hardware is spotlighted as the third industrial revolution, which leads popularization of product design/fabrication, along with the additive manufacturing. Users, who have played a role of consumer unilaterally in the past, begin directly designing and producing new products or components for maintenance by using a 3D printer. In addition, the number of 3D printable models freely available is greatly increasing over 120 thousands. As described above, as 3D printers and open-source hardware are propagated, DIY (do it yourself) by consumers become popular.

In addition, a web has been playing a role of a platform for sharing knowledge about open-source hardware as well as open-source software. Formation of consensus on the value of sharing economy along with information sharing realizes popularization of 3D printers and sharing of available 3D models using open-source hardware. Accordingly, consensuses on webs, cloud sourcing, social network, sharing economy or the like may be formed.

Meanwhile, as smart phones are propagated, works, which have been performed using a work station in the past, can be performed using a smart phone on the hand. Google has unveiled a prototype of a smart phone and a tablet computer having a 3D camera (or, a depth camera) through a Tango project. Due to such changes, augmented reality can be realized more rapidly, and a mobile terminal can recognize an object and acquire information about a real world in an easier and faster way. In addition, recognition of a product for DIY and tracking of 6 degrees of freedom (6-DOF) components for augmented reality may be realized in a mobile device.

However, there still remains a problem in relation to productive utilization behind the popularization of 3D printers. Most consumers capable of purchasing 3D printers have no interest on the technical understanding about a modeling process for generating 3D models to be supplied to the printers and just want a user-friendly method. Therefore, even though the demands on personalized custom products for personal needs are increasing, it is still deficient to supply sufficient 3D models.

In addition, most of simple DIY demands in the daily life relate to maintenance or remodeling of products possessed by the users. However, in order to fabricate DIY components suitable for the user's needs, a convenient service for proposing a DIY component suitable for physical information of a target product is required.

Moreover, even though a modeling method for a touch pad or a tablet has been developed along with propagation of smart mobile devices, consumers have no interest on such a technical modeling method, and thus there is demanded an alternative design for solving the modeling itself or sharing alternative knowledge.

Further, in spite of popularization of 3D printers, a great initial investment becomes an obstacle to actual use of 3D printers. In order to guide an easy DIY using a production method with no initial investment, it is needed to create a 3D printing environment for providing service which can be easily utilized with a low cost.

SUMMARY

The present disclosure is directed to providing a terminal for supporting 3D printing, which may be easily and conveniently used by a user.

The present disclosure is also directed to providing a method for supporting 3D printing, which may be easily and conveniently used by a user.

The present disclosure is also directed to providing a computer program recorded in a recording medium for performing the method for supporting 3D printing in association with hardware.

In one aspect, there is provided a terminal for supporting 3D printing, which includes: a product identification unit configured to identify a product; a web resource utilization unit configured to search and provide a 3D model present on a web in relation to the identified product; a suitability calculation unit configured to calculate and simulate suitability between the identified product and the searched 3D model based on information of the identified product and the searched 3D model; a transmission unit configured to transmit the 3D model information to a 3D printer to produce the 3D model; and a display unit configured to display the identified product, the searched 3D model and the simulation result.

In an embodiment of the present disclosure, the terminal for supporting 3D printing may further include an augmented reality visualization unit configured to display the identified product and the searched 3D model to augmented reality by using a depth camera.

In an embodiment of the present disclosure, the depth camera may be formed to be integrated with the terminal or separated from the terminal.

In an embodiment of the present disclosure, the augmented reality visualization unit may include: a download unit configured to download the searched 3D model; a 3D viewer unit configured to three-dimensionally analyze the searched 3D model; and an augmented reality control unit configured to provide the 3D model together with the searched product to augmented reality.

In an embodiment of the present disclosure, the augmented reality control unit may include: a pre-processing unit configured to remove noise of a RGB-D image provided by the depth camera; a product detection unit configured to extract a foreground from the RGB-D image; and a pose analysis unit configured to estimate poses of the product and the 3D model.

In an embodiment of the present disclosure, the product identification unit may identify a barcode of the product by using a camera of the terminal or identify the product from an image of the product.

In an embodiment of the present disclosure, the transmission unit may transmit the 3D model information to a local 3D printer or a cloud 3D printing agency.

In an embodiment of the present disclosure, the display unit may provide a user interface for supporting 3D printing.

In another aspect of the present disclosure, there is provided a method for supporting 3D printing, which includes: identifying a product; searching and providing a 3D model present on a web in relation to the identified product; calculating and simulating suitability between the identified product and the searched 3D model based on information of the identified product and the searched 3D model; and transmitting the 3D model information to a 3D printer to produce the 3D model.

In an embodiment of the present disclosure, the method for supporting 3D printing may further include displaying the identified product and the searched 3D model to augmented reality.

In an embodiment of the present disclosure, the displaying of the identified product and the searched 3D model to augmented reality may include: downloading the searched 3D model; three-dimensionally analyzing the searched 3D model; and providing the 3D model together with the searched product to augmented reality.

In an embodiment of the present disclosure, the providing of the 3D model together with the searched product to augmented reality may include: removing noise of a RGB-D image provided by a depth camera; extracting a foreground from the RGB-D image; and estimating poses of the product and the 3D model.

In an embodiment of the present disclosure, the identifying of a product may include identifying a barcode of the product by using a camera of the terminal or identifying the product from an image of the product.

In an embodiment of the present disclosure, the transmitting of the 3D model information to a 3D printer may include transmitting the 3D model information to a local 3D printer or transmitting the 3D model information to a cloud 3D printing agency.

In an embodiment of the present disclosure, the method for supporting 3D printing may further include providing an interface for supporting 3D printing.

In another aspect of the present disclosure, there is provided a computer program recorded on a recording memory, for performing the method for supporting 3D printing by using a terminal.

If the terminal and method for supporting 3D printing and the computer program for performing the method as described above are used, a methodology capable of solving an urgent problem of the DIY market is proposed, which allows actualization of DIY using a 3D printer, and also it is possible to provide a product recognition technique using a camera image of a mobile device, a component recognition technique using a depth camera and a 6 degrees of freedom (6-DOF) tracking technique capable of augmenting a 3D printable model.

This may enable integrated DIY maintenance in associated with product recognition, augmented reality, and 3D printing, which may be applied to a product group used in daily life by users, and this technique is practical and can be industrialized by means of sharing of open-source hardware knowledge and synergy of augmented reality and 3D printing technique.

In addition, the present disclosure may extend a life cycle of a product by filling the vacuum of after-sales service and also play a role of a platform for discovering additional service such as sharing of functions between various fabricators.

DETAILED DESCRIPTION

Figure 1:
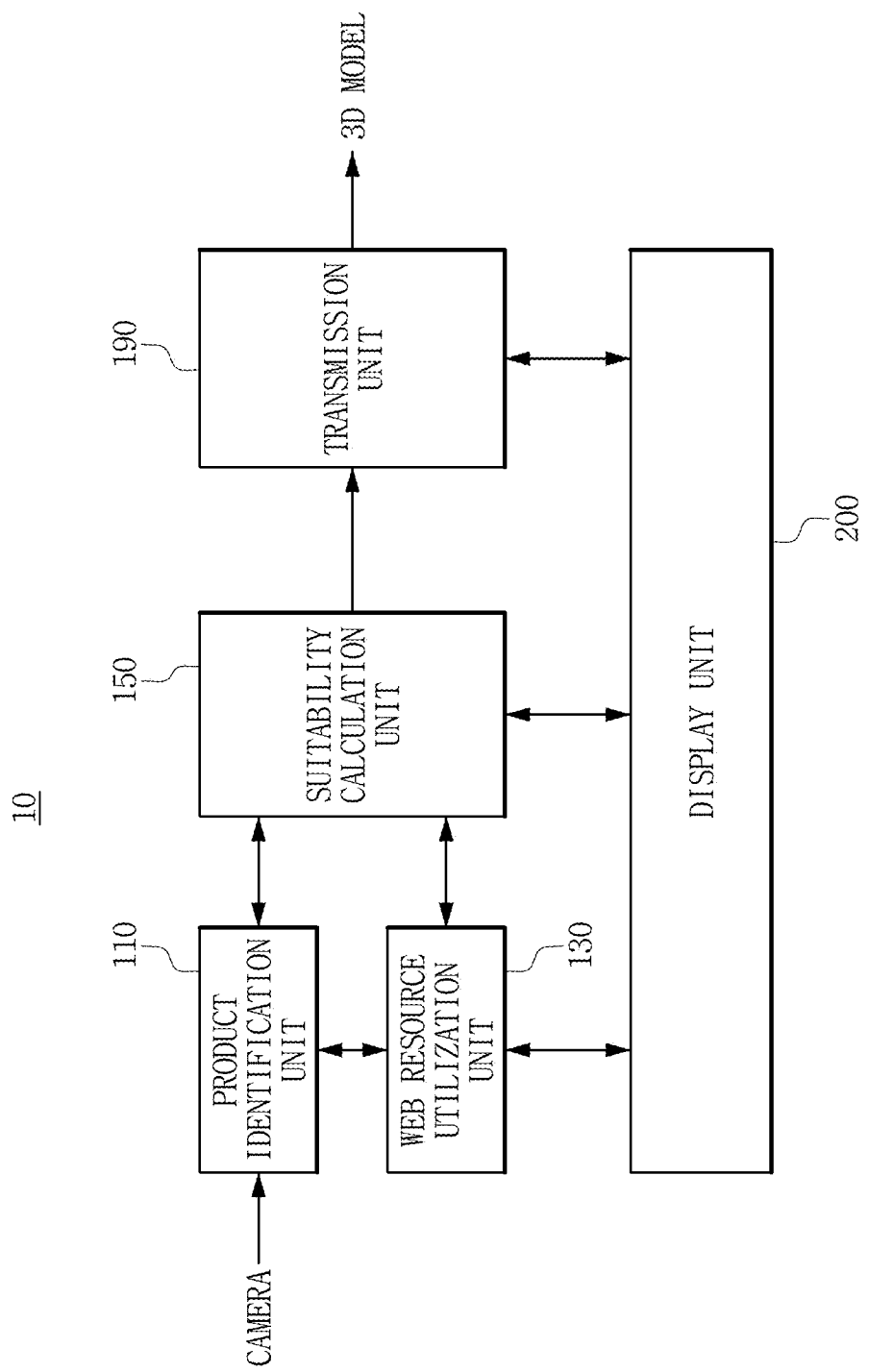
FIG. 1 is block diagram showing a terminal for supporting 3D printing according to an embodiment of the present disclosure.

The following detailed description of the present disclosure refers to the accompanying drawings which show specific embodiments implemented by the present disclosure. These embodiments are described in detail so as to be easily implemented by those skilled in the art. It should be understood that various embodiments of the present disclosure are different from each other but not exclusive from each other. For example, specific shapes, structures and features written herein can be implemented in other embodiments without departing from the scope of the present disclosure. In addition, it should be understood that locations or arrangements of individual components in each embodiment may be changed without departing from the scope of the present disclosure. Therefore, the following detailed description is not directed to limiting the present disclosure, and the scope of the present disclosure is defined just with the appended claims along and their equivalents, if it is suitably explained. In the drawings, like reference numerals denote like elements through several drawings.

Hereinafter, embodiments of the present disclosure will be described in detail with reference to the accompanying drawings.

Figure 2:
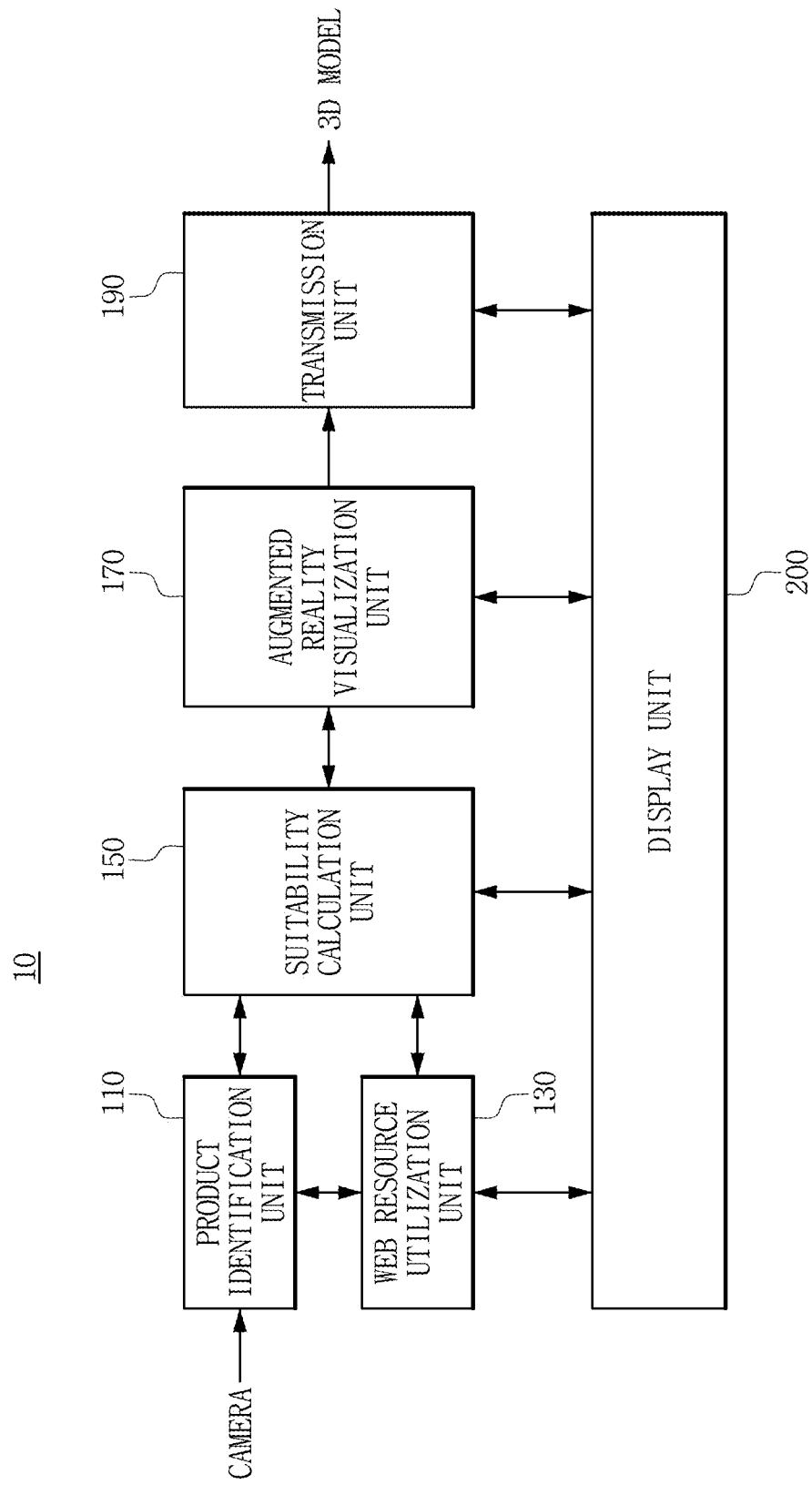
FIG. 2 is a block diagram showing a terminal for supporting 3D printing according to another embodiment of the present disclosure.

FIG. 1 is block diagram showing a terminal for supporting 3D printing according to an embodiment of the present disclosure, and FIG. 2 is a block diagram showing a terminal for supporting 3D printing according to another embodiment of the present disclosure.

The terminal 10 for supporting 3D printing (hereinafter, referred to as the terminal) may employ various kinds of mobile devices such as smart phones, cellular phones, tablet computers, netbooks, PDA, PMP, wearable computers or the like. In addition, the terminal 10 may also called using various terms such as a device, an apparatus, a terminal, user equipment (UE), a mobile station (MS), a mobile terminal (MT), a user terminal (UT), a subscriber station (SS), a wireless device, a personal digital assistant (PDA), a wireless modem, a handheld device, a wearable device or the like.

In addition, the terminal 10 may execute various application programs based on an operation system (OS). The operation system is a system program for allowing any application program to use hardware of a computer and may employ any kind of operation system loaded on a mobile terminal, for example iOS, Android OS, Windows mobile OS, Bada OS, Simbian OS, Blackberry OS or the like.

The application program is developed to perform a specific work using a computer and may employ various kinds of applications as well as various multimedia contents or execution programs of image viewers or moving picture regenerators for the various multimedia contents.

However, the terminal 10 may also have a fixed form such as a desktop computer, a monitor, a smart TV, a server or an engine, different from the above.

Referring to FIG. 1, the terminal 10 according to the present disclosure automatically identifies a target product, searches and recommends a printable model, evaluates suitability of the model, simulates the model using augmented reality, and orders 3D printing therefor by just one click. For this, the terminal 10 includes a product identification unit 110, a web resource utilization unit 130, a suitability calculation unit 150, a transmission unit 190 and a display unit 200. As another embodiment of the present disclosure, the terminal 10 may further include an augmented reality visualization unit 170 as shown in FIG. 2.

Software (or, an application) for supporting 3D printing may be installed and executed at the terminal 10, and the components such as the product identification unit 110 may be controlled by the software for supporting 3D printing, executed at the terminal 10. In addition, the components such as the product identification unit 110 may be integrated into a single module or formed as individual modules.

The display unit 200 displays a series of processes, performed by the 3D printing software at the terminal 10 and provides a user interface including an input menu, a selection menu, an addition menu or the like.

The display unit 200 may employ any of a liquid crystal display (LCD) panel, a plasma display panel (PDP), an organic light-emitting diode (OLED) display panel, a spectacle display or the like. In addition, the display unit 200 may also be a mobile display such as a mobile pad, a smart phone, a wearable computer or the like.

In an embodiment, the user interface for allowing a user input may be provided on the display unit 200 having a touch-screen function. Accordingly, a user may input data to an image displayed on the display unit 200 directly by using the hand or an electronic pen. In addition, the display unit 200 may include various kinds of input units such as a keypad, a keyboard, a mouse, a joystick, a touch pad, a button or the like.

The product identification unit 110 identifies a product requested by the user. The product identification unit 110 may identify a product in various ways by utilizing functions of the terminal 10.

For example, the product identification unit 110 may identify a product through a barcode attached to the product by using a camera included in the terminal 10. Product information of most products distributed in these days may be identified by means of a barcode system.

The product identification unit 110 may identify a barcode by using the camera of the terminal 10 and acquire an exact product name of the corresponding product by linking the identified barcode with a product DB. The product name identified by the barcode may be utilized to construct a database by mashing-up a huge amount of product information through a web API such as Google API, Amazon API, SearchUPC or the like.

As another example, a product name may be directly acquired from an image obtained by the camera. In another case, a user may directly input an inherent number or a product name of a product to the terminal 10 so that the product identification unit 110 may identify the product. As another example, the product identification unit 110 may identify product information by directly identifying image or shape information of a product from the camera of the terminal 10.

In addition, the product identification unit 110 may search printable 3D models of the product identified by using a product name in the product DB as a keyword, and display an item list in the display unit 200. From this, the user may easily check a search history and search results.

The web resource utilization unit 130 searches and provides 3D models present on the web in relation with the identified product. In other words, the web resource utilization unit 130 collects 3D-printable models in relation to the product from web resources by using the product name acquired by the product identification unit 110.

The web resource utilization unit 130 may provide a proxy server in order to utilize 3D model resources present on the web and give additional service to the user. For example, by searching warehouses of 3D printable models such as Thingiverse, Yeggi or the like, the web resource utilization unit 130 may provide information about 3D models in relation to the product, requested by the user, among about 120,000 models available at the present.

In this case, a search result about a search word used by the user may be stored in the proxy server, and a standby time of the user may be reduced by caching images and STL files included in the search result in advance. In addition, an overload may be reduced by summarizing only information required by the web resource utilization unit 130.

In addition, the web resource utilization unit 130 may provide recognition information of a product present on the web. In other words, inherent information of the product required by identifying the product by the product identification unit 110 may be collected from information present on the web and then provided.

The suitability calculation unit 150 calculates and simulates suitability between the identified product and the searched 3D model based on the information of the identified product and the searched 3D model. Accordingly, the user may be provided with additional service for determining the degree of compatibility between a 3D model to be printed and a product subject to DIY.

The suitability between a product and a 3D model is determined by checking whether assembling is available based on the shape information of the product and the 3D model. The suitability determination result may be transmitted to the proxy server, and the compatibility of the 3D model to be printed may be provided to the user in, for example, three status such as good, normal and bad. The proxy server may arrange the compatibility determination results in order and convert the results of identified products into a JSON (JavaScript Object Notation) form of Table 1 below, which is a lightweight data exchange format.

TABLE 1

| Field Name | Field Description |
|---|---|
| Title | title |
| Desc | detailed description |
| Thumb | thumbnail image |
| Like | frequency that the corresponding 3D model is preferred by other users |
| Collect | other 3D model collection for storage by an uploader |
| Fit | suitability evaluation |
| Target | Information about a target |
| URL | URL which has received 3D model information |
| Feasibility | whether an uploaded 3D model file is executable |
| ID | ID of an uploaded file |
| Image | uploaded photograph |
| File name | file name of an uploaded 3D model |
| Model | file of an uploaded 3D model |
| File size | file size of an uploaded 3D model |

The augmented reality visualization unit 170 displays the product identified by the product identification unit 110 using a depth camera and the 3D model searched by the web resource utilization unit 130 in the augmented reality. The augmented reality visualization unit 170 visualizes the product and the 3D printable model of the user together by using the augmented reality in order to help the user who is to select a final model from the selected 3D models for the corresponding product. Accordingly, the user may efficiently acquire information of the selected 3D model.

Figure 3:
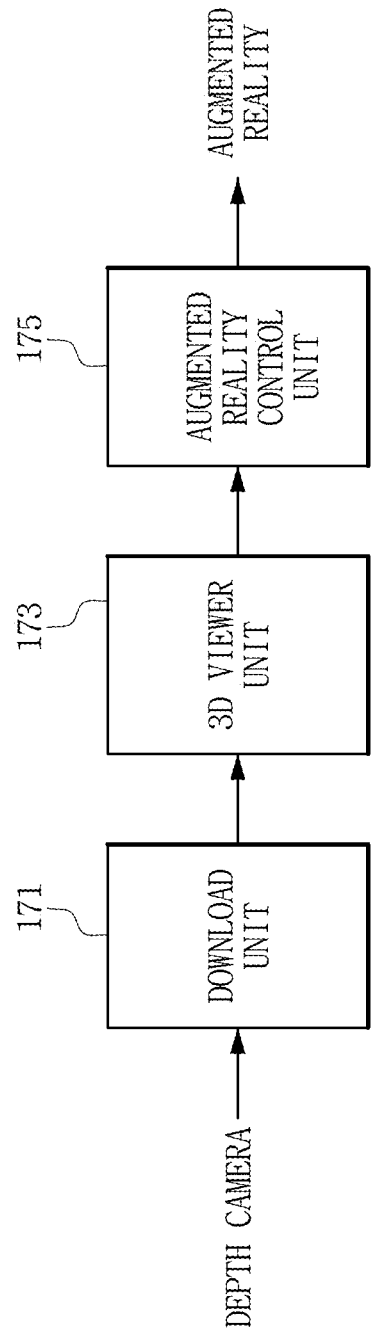
FIG. 3 is a detailed block diagram showing an augmented reality visualization unit depicted in FIG. 2.

For this, referring to FIG. 3, the augmented reality visualization unit 170 includes a download unit 171 configured to download the searched 3D model, a 3D viewer unit 173 configured to three-dimensionally analyze the searched 3D model and an augmented reality control unit 175 configured to provide the 3D model together with the searched product to augmented reality.

The download unit 171 may load a 3D model file, including a STL file with a 3D printer standard file format, in real time through a web URL. A STL file loader may support both a binary system and an ASCII system and perform three-dimensional rendering using the loaded file information.

The 3D viewer unit 173 analyzes a 3D image, which may utilize color and depth simultaneously, by using a depth camera. The augmented reality control unit 175 shows the 3D model to be printed by means of augmented reality together with the product, thereby providing suitability with the product and information about an application method. By doing so, the user may select a final 3D model after considering predictable problems from the 3D printing results in advance.

The 3D viewer unit 173 and the augmented reality control unit 175 use a RGB-D image of the depth camera. The 3D viewer unit 173 may use a RGB-D camera mounted at the terminal 10 in order to augment a 3D model to be printed together with an original product and combined with the product by the augmented reality control unit 175. The depth camera functions to acquire three-dimensional geometric information of the product by using infrared rays.

The depth camera may be integrated with the terminal 10 or separately formed from the terminal 10. If the depth camera is provided as a module or device separate from the terminal 10, images may be transmitted or received by means of wired or wireless communication.

Different from the above, the RGB-D camera may be independently mounted to the terminal 10 and conveniently used without any separate connection. As the RGB-D camera is used, the present disclosure gives the following advantages in comparison to an existing camera-based system.

First, in a traditional computer vision, 3D information estimation has been performed through a series of complicated processes (feature extraction and matching, rigid/non-rigid conversion) from at least one 2D color image. However, if a depth camera is used as in the present disclosure, 3D information is acquired in real time without any separate process, which ensures easier 3D analysis.

Second, the present disclosure uses a camera mounted at a mobile terminal and thus is no limitation in its mobility, different from an existing system based on a camera for a desktop. In addition, since an I/O process for input data is operated at a mobile device independently, 3D data analysis result may be checked in real time without any separate process.

Third, conventional 3D scanning or 3D model reconstruction of RGB-D images mostly use 3D CAD model such as surface scanning of a subject which utilizes high-level hardware resources. However, the present disclosure provides a novel production model in which a 3D model can be checked in advance by means of the color-depth-reflected augmented reality technology before 3D printing.

Figure 4:
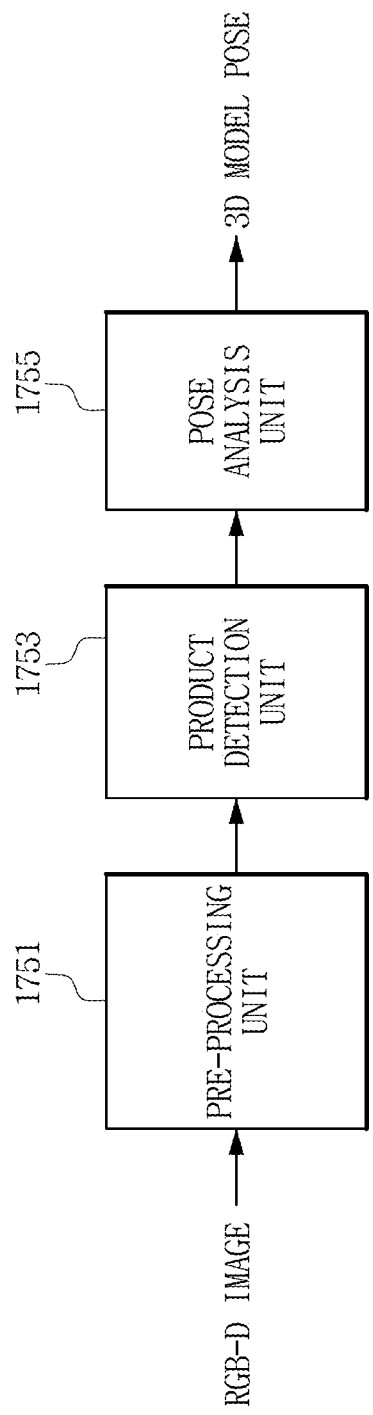
FIG. 4 is a detailed block diagram showing an augmented reality control unit depicted in FIG. 3.

Referring to FIGS. 4 and 5, the augmented reality control unit 175 includes a pre-processing unit 1751, a product detection unit 1753 and a pose analysis unit 1755 in order to augment a product and a 3D model suitable therefor and provide them to the user in real time.

The pre-processing unit 1751 removes nose of the RGB-D image provided from the depth camera. By removing noise and improving quality for the input RGB-D image, a pre-process is performed to obtain an improved result in a following product detection step and a pose analyzing step. For this, improved data may be generated by means of smoothing and hole filling.

Figure 5A:
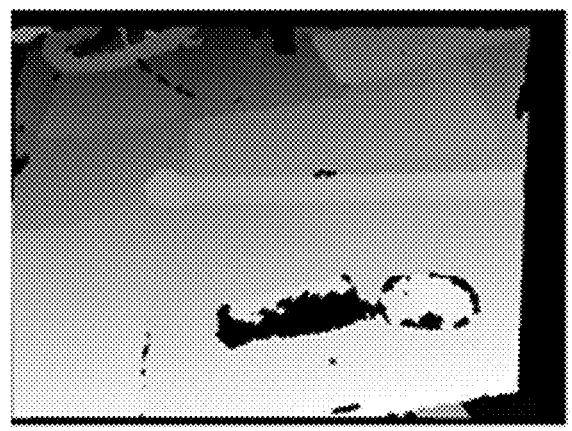
FIGS. 5A to 5E show examples of depth images and 3D model images obtained by the augmented reality control unit of FIG. 3.
Figure 5B:
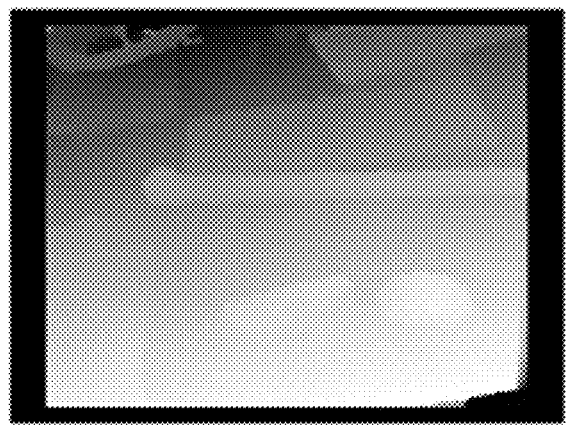

FIG. 5A shows an example of a depth image of a product, and FIG. 5B shows a depth image preprocessed from FIG. 5A.

Figure 5C:
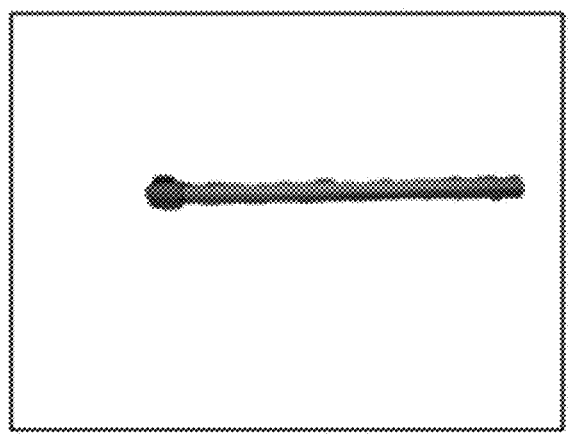

The product detection unit 1753 extracts a foreground from the RGB-D image. By using the acquired RGB-D image, divided three-dimensional regions are obtained for the product. For this, geometric information including a curvature of a surface of a product to be detected and a product located near the camera are detected. Color information is simultaneously used for dividing the depth image, thereby accurately detecting a 3D product area. FIG. 5C shows a product detection result.

The pose analysis unit 1755 estimates poses of the product and the 3D model. The pose analysis unit 1755 estimates a pose of the product from a three-dimensional product region defined by the product detection unit 1753 and defines a pose of the 3D model based thereon. The pose of the product is defined using a relative coordinate system calculated by analyzing the three-dimensional product region based on a camera coordinate system. The product coordinate system moved to a predefined combined portion of the product and the model is defined as a pose of the 3D model, and this is utilized for augmenting the 3D model by the augmented reality control unit 175.

Figure 5D:
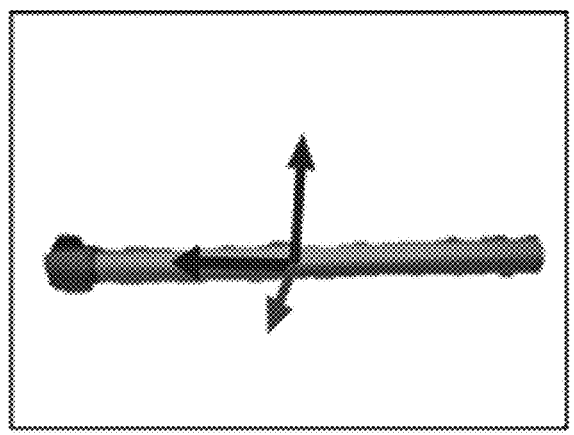
Figure 5E:
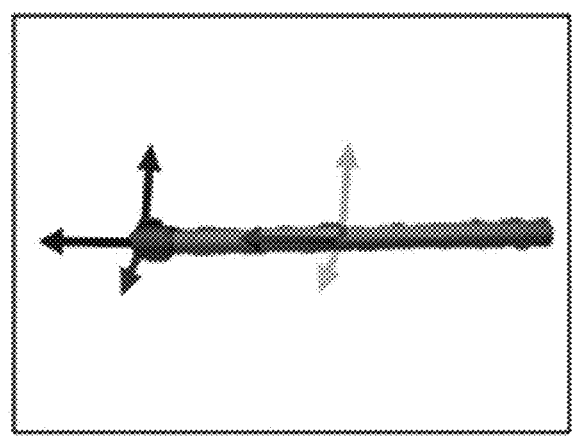

FIG. 5D shows an example of an estimated pose of the product pose, and FIG. 5E shows an example of an estimated pose of the 3D model.

The transmission unit 190 transmits the 3D model information to a 3D printer to produce the 3D model. For example, the transmission unit 190 may transmit the 3D model information to a cloud 3D printing agency. If the user selects a cloud 3D printing agent service through the transmission unit 190, the user may be connected to a cloud 3D printing agent service such as i.materialise, sculpteo, shapeways and 3D HUBS.

Therefore, according to the present disclosure, 3D printable models may be conveniently transmitted through the 3D printing agent service, and the user may receive a printed 3D model.

As another example, the transmission unit 190 may transmit the 3D model information to a local 3D printer. If the user selects the local 3D printer, the 3D model and necessary information are transmitted to the selected printer to produce the corresponding model. The terminal of the present disclosure may be connected to the local 3D printer conveniently in a wireless manner, like a cloud printer.

Figure 6:
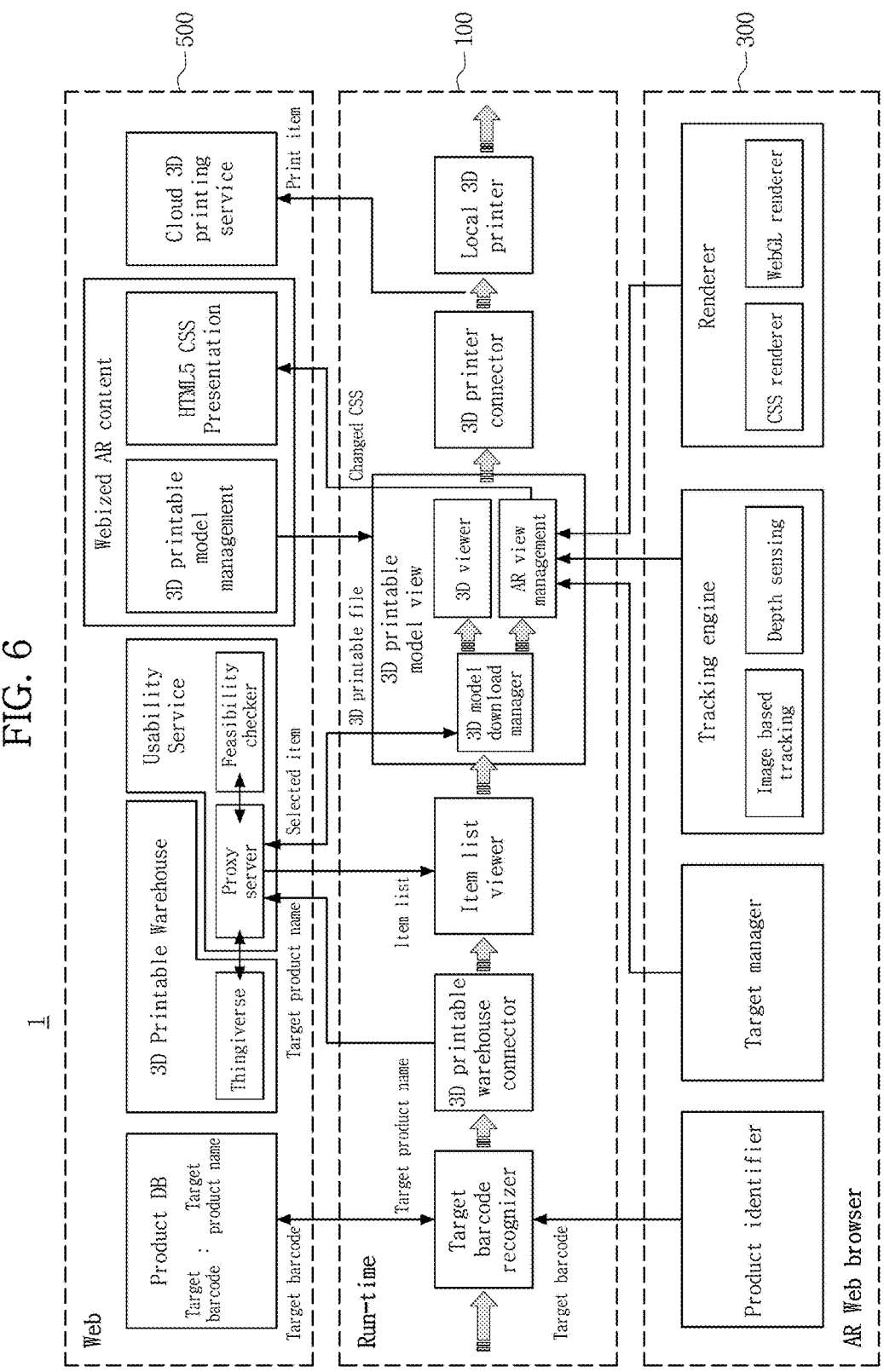
FIG. 6 is a diagram showing an example of a system for supporting 3D printing in the present disclosure.

FIG. 6 shows an example of a system 1 for supporting 3D printing according to the present disclosure.

Referring to FIG. 6, the system 1 includes three layers, including a web-based augmented reality platform 300, a block 100 showing processes executed while the method for supporting 3D printing according to the present disclosure is in a run time, and a block 500 present on the web.

The method for supporting 3D printing according to the present disclosure may be implemented as an augmented reality web application (AR Web App) in the form of HTML5-based augmented reality contents authoring platform. The HTML5-based augmented reality platform is developed with web-based techniques such as HTML, CSS and JavaScript, which ensures simplicity, modularization and distribution, which are features of the web, and various media resources may be reused using hyperlinks and URI.

In the present disclosure, a precise 6 degrees of freedom (6-DOF) tracking function using a structure function is added by expanding an existing tracking engine, thereby enhancing accuracy in product recognition, and a WebGL renderer of a situated renderer is used to show augmented reality to the user, which helps better understanding of the intend of model authoring and application method of the model.

Figure 7:
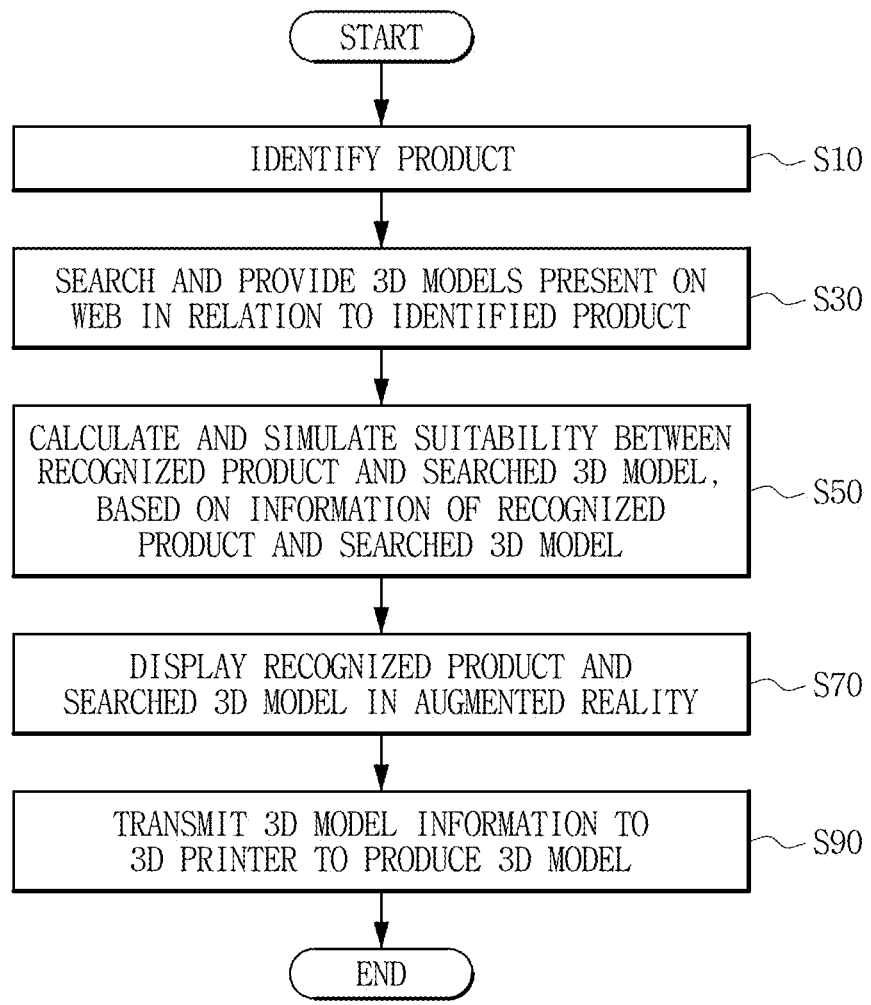
FIG. 7 is a flowchart for illustrating a method for supporting 3D printing using the terminal according to an embodiment of the present disclosure.
Figure 8:
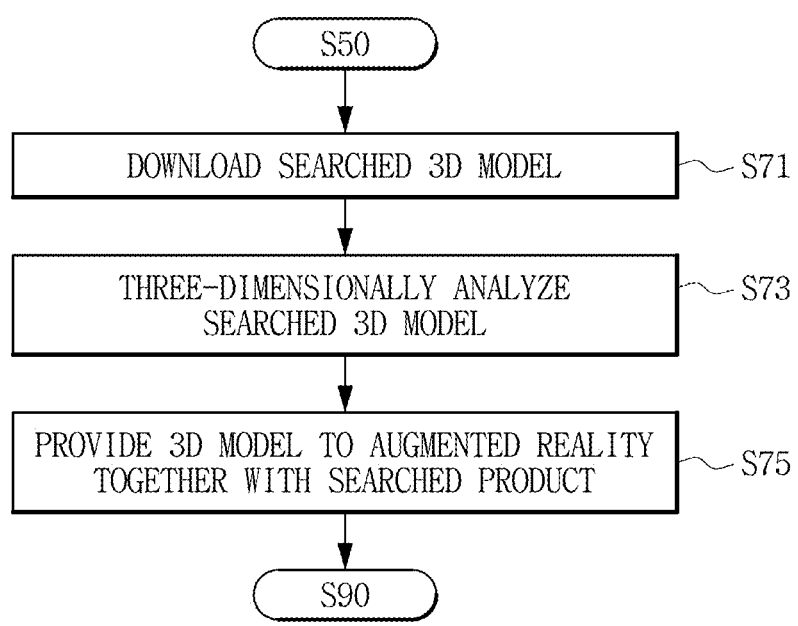
FIG. 8 is a detailed flowchart for illustrating an augmented reality displaying step of FIG. 7.

FIG. 7 is a flowchart for illustrating a method for supporting 3D printing using the terminal according to an embodiment of the present disclosure, and FIG. 8 is a detailed flowchart for illustrating an augmented reality displaying step of FIG. 7.

By using the terminal of this embodiment, the method for supporting 3D printing may be performed in substantially the same configuration as the terminal 10 of FIG. 1 or 2. Therefore, the same component as in the terminal 10 of FIG. 1 or 2 is endowed with the same reference symbol and not described in detail here.

In addition, the method for supporting 3D printing using the terminal of this embodiment may be executed by software (application) for supporting 3D printing by using the terminal.

Referring to FIG. 7, by using the terminal of this embodiment, the method for supporting 3D printing identifies a product according to the request of a user (S10). The product may be identified using a camera included in or connected to the terminal or through a barcode marked on the product. In addition, the product may be identified from an image of the product by using a camera included in or connected to the terminal.

If the product is identified, 3D models present on the web in relation to the identified product are searched and provided (S30). At this time, a proxy server may be provided to utilize 3D model resources present on the web and give additional service to the user.

If the product is searched, based on the information of the identified product and the searched 3D model, suitability between the identified product and the searched 3D model is calculated and simulated (S50). Accordingly, the user may be provided with additional service for determining the degree of compatibility between a 3D model to be printed and a product subject to DIY.

In addition, the identified product and the searched 3D model are displayed in augmented reality (S70), which may help the user to select a final model from the selected 3D models searched for the corresponding product.

Referring to FIG. 8, S70 for displaying the identified product and the searched 3D model in augmented reality may include downloading the searched 3D model (S71), three-dimensionally analyzing the searched 3D model (S73) and providing the 3D model to the augmented reality together with the searched product (S75).

S75 for providing the 3D model to the augmented reality together with the searched product may include removing noise of a RGB-D image provided by the depth camera, extracting a foreground from the RGB-D image, and estimating poses of the product and the 3D model.

In the simulation step (S50) or the augmented reality displaying step (S70), the user may select a 3D model to be selected and transmit the 3D model information to a 3D printer to produce the 3D model (S90).

At this time, according to the selection of the user, the 3D model information may be transmitted to a local 3D printer or a cloud 3D printing agency.

The method for supporting 3D printing according to the present disclosure is operated in a terminal, particularly in a mobile environment, and thus a user may easily search a desired product and accurately identify and track the product. In addition, all procedures from recognition of a product to transmission of a selected 3D model to a 3D printer or agency are performed as a single process, which may enhance usability and functionality of 3D printing.

The method for supporting 3D printing may be implemented with software (or, an application).

Figure 9:
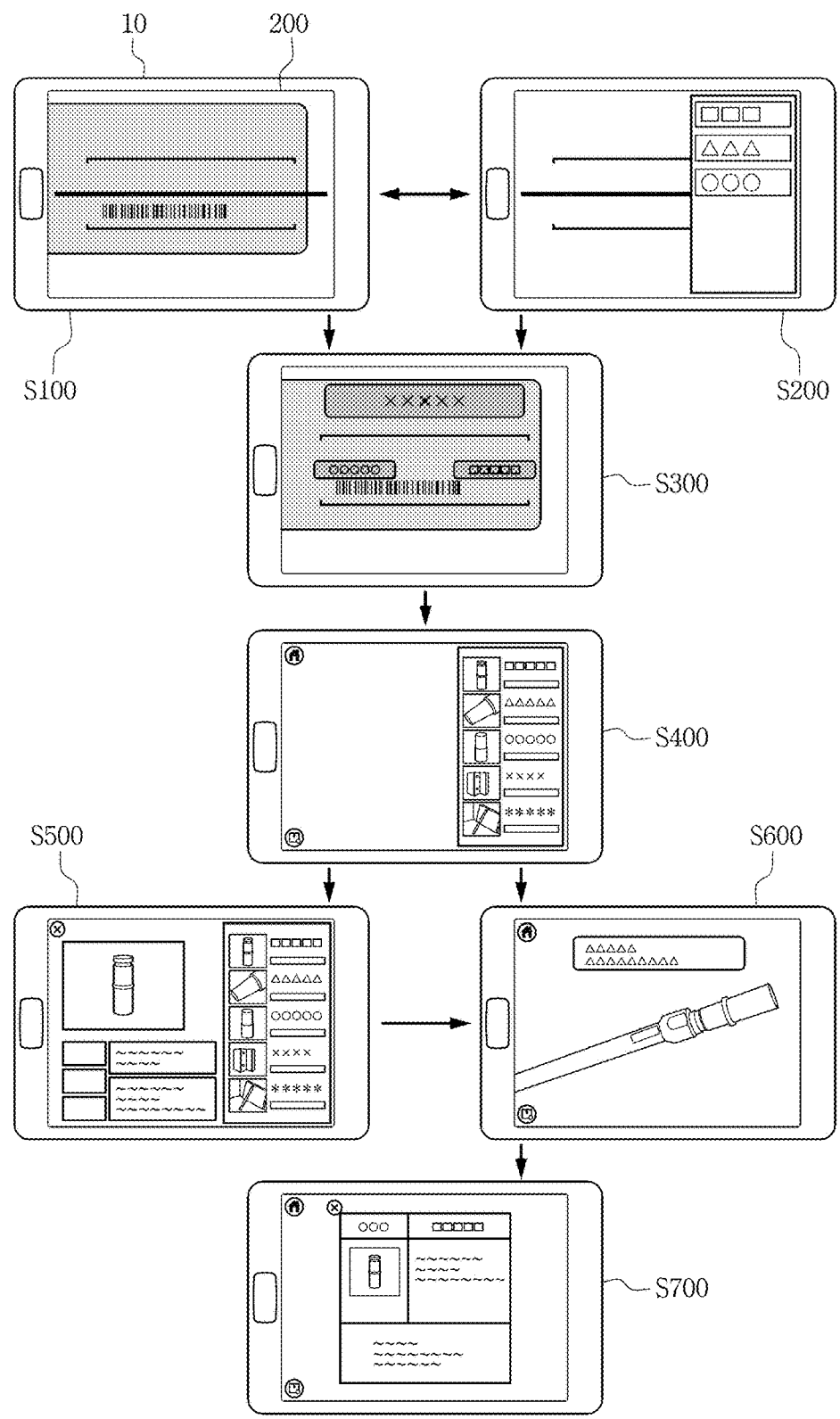
FIG. 9 shows a menu configuration of a user interface, provided to implement the method for supporting 3D printing according to the present disclosure, in order.

FIG. 9 shows an example of a menu configuration of a user interface, which is provided to implement the method for supporting 3D printing according to the present disclosure. For example, in the case where a suction hole of a vacuum cleaner produced by a company A is broken and thus a user intends to use a suction hole of a vacuum cleaner produced by a company B, 3D printing is performed as follows to make a connector for compatibility between two suction holes.

Referring to FIG. 9, a product is searched using a barcode (S100). As a first stage for executing an application which supports 3D printing, the barcode is identified to search 3D models in relation to the product in interest. The user may place the barcode to a suitable location by using an auxiliary line or guide so that the product may be easily scanned. In addition, when the barcode is identified, a sound effect may be provided so that the user may feel like using an actual barcode reader, which ensures a beginner to easily search a product.

At this time, a search history menu may be provided (S200). The history menu at a right side of the display unit 200 of the terminal 10 may provide information about barcodes and product names, which have been searched in the past by the user. A path for accessing information is shortened using the history information, and thus the user may save trouble for identifying a barcode again for a product which has been searched before.

If the barcode is searched, a barcode search result is displayed (S300). If a product name suitable for the barcode is searched, the product name is displayed at a top portion, and the user may select whether to search 3D printable models for the product or to search another product. If the user presses a button for finding 3D printable models, a progress bar may show a current progress while resources present on the web are being searched.

The 3D printable models for the corresponding product are searched, and then a search result is displayed (S400). If information is completely received from the server, an item menu may be activated to show a list of search results. If the user selects any item in the list, detailed information for the item may be provided.

In addition, it is possible to provide service for determining suitability between a 3D model and a target for augment. Each item of the list provides information about a model name, popularity (for example, marked with hearts), and suitability (fit). The determined suitability gives information about how much the 3D model matches with the target subject when being printed. Through this information, the user may preferentially receive 3D model information which is determined as being suitable, and erroneous 3D model printing may be prevented in advance, which may save 3D printing costs.

Subsequently, detailed information of the selected 3D model is provided (S500). In this step, detailed information of the 3D model is provided by means of crowd sourcing, and the user may check information about other 3D models present in the same item, in addition to the representative 3D model displayed in the list. In addition, evaluations on the selected item by other users may also be provided together.

In this case, information of the 3D model may be provided in various ways. For example, if a user wants to see the selected 3D model while rotating the 3D model with a 360 degree revolution, instead of an augmented state, the user may press a 3D View button and see the 3D model through touch interaction. In addition, the user may press an AR View button to display a desired 3D model in an augmented state among several 3D models present in the item. Moreover, for a user who wants to know a source of the detailed information of the product, a button linked to a webpage of the 3D model may also be provided.

Further, a realistic 3D model may be checked by means of augmented reality (S600). A button for moving to a first-stage screen for executing a program (application) supporting 3D printing may be provided at a left top portion of the screen displaying the 3D model to be augmented over the product, so as to search a barcode of another product. In addition, a name of a 3D model currently augmented and its suitability information with a target may be displayed at the central top portion for recognition at a glance, and a button for printing a 3D model currently displayed may be provided at the left bottom portion.

Finally, a menu for printing a finally checked 3D model using the augmented reality is provided (S700). Photograph information and name of the 3D model to be output are notified again at a left portion, and connectable 3D printers and service companies for outputting may be provided at a right portion for selection. In addition, an edit button may be provided to set or edit a setting about a 3D print or a service company.

However, the user interface provided for implementing the method for supporting 3D printing as shown in FIG. 9 is just an example, and the user interface may be configured or modified as necessary without being limited thereto.

The method for supporting 3D printing may be implemented as an application or program commands executable by various kinds of computer means and recorded on a computer-readable recording medium. The computer-readable recording medium may include program commands, data files, data structures or the like solely or in combination.

The program commands recorded on the medium may be specially designed or configured for the present disclosure or known to and available by computer software engineers.

The computer-readable recording medium includes, for example, magnetic media such as a hard disk, a floppy disk and a magnetic tape, optical media such as CD-ROM and DVD, magneto-optical media such as a floptical disk, hardware devices such as ROM, RAM and a flash memory, specially configured to store and perform program commands, or the like.

The program commands include not only machine codes made by a complier but also high-level language codes executable by a computer by using an interpreter. The hardware device may be configured to operate as at least one software module to perform the operations of the present disclosure, or vice versa.

While the exemplary embodiments have been shown and described, it will be understood by those skilled in the art that various changes in form and details may be made thereto without departing from the spirit and scope of this disclosure as defined by the appended claims.

Recognition of products and search and augmentation of 3D printable models provided by the present disclosure may be useful for consumers in various ways, without being limited to a specific product group. In view of consumers, 3D printable models of various fields, present in 3D printable warehouses, may be utilized to help DIY of a hole electronic product or the like and may also be used for DIY in various fields such as automobiles, leisure or the like.

In view of a one-person enterprise, a 3D model developer may upload fabricated 3D models in a 3D printable warehouse as charged models. By providing models of customized components of special purposes, which cannot be mass-produced, and products fabricated in consideration of characteristics of individual consumers, it is possible to establish a business model for small quantity batch product.

In view of an industry the present disclosure may facilitate reduction of maintenance costs of equipment and provide a visualized manual for solving a problem by identifying a component to be repaired and utilizing the augmented reality technique. Therefore, products may be maintained easily by unskilled users.

In addition, product information DB and suitability information about product groups in various fields such as household appliances, living, home decorations, offices, automobiles, leisure, fashion or the like may be provided in the form of In-App purchase so that a real-time assembling and inspection function may be provided to users, who want product service of each field and DIY, through the In-App purchase. In addition, a developer of a charged 3D model may sell fabricated 3D models at the 3D printable warehouse, which creates additional service by which a user may easily purchase a 3D model by means of In-App purchase.

What is claimed is:
1. A terminal for 3D printing, comprising:
a camera configured to obtain image information associated with an object;
a product identification processor configured to identify the object and identify a pre-existing product matching the identified object, based on the image information;

a web resource utilization processor configured to search a web-based database to find a three-dimensional (3D) model of the identified product;
a suitability calculation processor configured to calculate suitability between the identified product and the found 3D model based on information of the identified product and the found 3D model;
a display configured to display the identified product, and display the found 3D model in a list with other 3D models based on the calculated suitability, to enable a user to select the displayed 3D model;
an augmented reality visualization processor configured to augment the selected 3D model over the identified product such that a pose of the selected 3D model is tracked to a pose of the identified product, by moving a coordinate system of the identified product to a location common to a portion of the identified product and a corresponding portion the selected 3D model, to enable the user to confirm the augmented 3D model; and
a transmitter configured to transmit information on the confirmed 3D model to a 3D printer to manufacture the confirmed 3D model.

2. The terminal according to claim 1, further comprising:
an augmented reality visualization processor is further configured to augment the selected 3D model by using a depth camera.

3. The terminal for according to claim 2,
wherein the depth camera is integrated with the terminal or separated from the terminal.

4. The terminal according to claim 2, wherein the augmented reality visualization processor includes:
a downloader configured to download the selected 3D model;
a 3D viewer configured to three-dimensionally analyze the selected 3D model; and
an augmented reality controller configured to provide the selected 3D model together with the product in augmented reality.

5. The terminal according to claim 4, wherein the augmented reality controller includes:
a pre-processor configured to remove noise of a RGB-D image provided by the depth camera;
a product detection processor configured to extract a foreground from the RGB-D image; and
a pose analysis processor configured to estimate the pose of the identified product and the pose of the selected 3D model.

6. The terminal according to claim 1,
wherein the 3D printer is local to the user or located at a cloud 3D printing agency.

7. The terminal according to claim 1,
wherein the display is further configured to provide a user interface to support 3D printing by the 3D printer.

8. A method for 3D printing, comprising:
identifying a pre-existing product matching an object based on image information associated with the object;
searching a web-based database to find a 3D model of the identified product;
calculating suitability between the identified product and the found 3D model based on information of the identified product and the found 3D model;
displaying the identified product and displaying the found 3D model in a list with other 3D models based on the calculated suitability, to enable a user to select the displayed 3D model;
augmenting the selected 3D model over the identified product such that a pose of the selected 3D model is tracked to a pose of the identified product, by moving a coordinate system of the identified product to a location common to a portion of the identified product and a corresponding portion the selected 3D model;
enabling the user to confirm the augmented 3D model; and
transmitting information on the confirmed 3D model to a 3D printer to manufacture the confirmed 3D model.

9. The method according to claim 8, wherein the displaying of the identified product and the selected 3D model on the augmented reality display comprises:
downloading the selected 3D model from the web-based database to a local terminal;
analyzing the selected 3D model; and
providing the selected 3D model together with the product to an augmented reality display.

10. The method according to claim 9, wherein the providing of the selected 3D model together with the product to augmented reality display further comprises:
removing noise of an RGB-D image provided by a depth camera; and
extracting a foreground from the RGB-D image.

11. The method according to claim 8,
wherein the image information associated with the object comprises a barcode associated with the object or a 2 or 3 dimensional image of the object.

12. The method according to claim 8,
wherein the 3D printer is local to the user or located at a cloud 3D printing agency.

13. The method according to claim 8, further comprising:
providing an interface to support printing of the confirmed 3D model on the 3D printer.

14. A non-transitory computer-readable medium storing instructions that, when executed by a processor, cause the processor to
identify a pre-existing product matching an object based on image information associated with the object,
search a web-based database to find a 3D model of the identified product,
calculate suitability between the identified product and the found 3D model based on information of the identified product and the found 3D model,
display the identified product and display the found 3D model in a list with other 3D models based on the calculated suitability, to enable a user to select the displayed 3D model,
augment the selected 3D model over the identified product such that a pose of the selected 3D model is tracked to a pose of the identified product, by moving a coordinate system of the identified product to a location common to a portion of the identified product and a corresponding portion the selected 3D model,
enable the user to confirm the augmented 3D model, and
transmit information on the confirmed 3D model to a 3D printer to manufacture the confirmed 3D model.

15. The method of claim 10, wherein the extracting of the foreground from the RBG-D image comprises obtaining divided three-dimensional regions for the identified product by using the RGB-D image.

16. The method of claim 15, wherein the divided three-dimensional regions are obtained by detecting a curvature of a surface of the identified product, and simultaneously using color information of the RBG-D image.

17. The method of claim 16, wherein the augmenting of the 3D model over the product comprises determining the coordinate system of the identified product by analyzing the three-dimensional regions based on a coordinate system of the camera.

18. The method of claim 8, further comprising identifying another product that the user intends to connect to the selected 3D model, and in response to detecting a mismatch between a coupling of the selected 3D model and a coupling of a 3D model of the another product, modifying the selected 3D model so that there is a match between the coupling of the selected 3D model and the coupling of the 3D model of the another product.

19. The method of claim 8, wherein the augmenting of the selected 3D model comprises augmenting the selected 3D model as a foreground against a blank background.

* * * * *